(12) United States Patent
Brush, II et al.

(10) Patent No.: US 6,366,285 B1
(45) Date of Patent: *Apr. 2, 2002

(54) SELECTION BY PROXIMITY WITH INNER AND OUTER SENSITIVITY RANGES

(75) Inventors: Abbott Purdy Brush, II, Woodbridge, CT (US); David Bruce Lection, Raleigh; David Allen Schell, Durham, both of NC (US)

(73) Assignee: International Business Machines Corporation, Armonk, NY (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/976,435

(22) Filed: Nov. 21, 1997

(51) Int. Cl.[7] ............................................. G06T 15/70
(52) U.S. Cl. ....................... 345/473; 345/706; 345/848
(58) Field of Search ................................. 345/433, 355, 345/145, 348, 473, 619, 706, 708, 848, 850

(56) References Cited

U.S. PATENT DOCUMENTS 5,261,041 A * 11/1993 Susman ...................... 395/152
5,696,674 A * 12/1997 Trovato et al. ............. 364/167.01

OTHER PUBLICATIONS

Hanqiu Sun ("A relation Based Model for Animating Adaptive Behavior in Dynamic Environments"—Mar. 1997, IEEE), 1083–4427/97.*
Pimental et al. ("Virtual Reality: Through the new looking glass": ISBN: 0–8306–4065–7), 1992.*
Sukhan Lee ("Interactive and Cooperative Sensing and control for Advanced Teleoperation":SOAR '92), 1992.*
Wolfgang Broll ("Populating the Internet:supporting multiple users and shared applications with VRML": Proceedings of the second symposium on virtual reality modeling language: Feb. 24–26, 1997, Monterey, CA).*

* cited by examiner

*Primary Examiner*—Mark Zimmerman
*Assistant Examiner*—Mano Padmanabhan
(74) *Attorney, Agent, or Firm*—Jeanine S. Ray-Yarletts; Marcia L. Doubet

(57) ABSTRACT

A method and apparatus for selecting objects in a virtual world through the use of inner and outer selection ranges. Inner selection ranges define the distance from an object an avatar must be to trigger a selection event to initiate interaction with the object. Outer selection ranges define the distance from an object an avatar may travel before triggering a de-selection event to the object which terminates interaction with the object. The method and apparatus is defined for implementation in virtual objects or virtual world frameworks.

35 Claims, 6 Drawing Sheets

SELECTION BY PROXIMITY WITH INNER AND OUTER SENSITIVITY RANGES

RELATED APPLICATIONS

The present application is related to U.S. patent application Ser. No. 08/746,695, entitled "Communication Between Intelligent Virtual Objects," filed on Nov. 14, 1996 and U.S. Pat. No. 5,884,029, entitled "User Interaction with Intelligent Virtual Objects," filed on Nov. 14, 1996.

FIELD OF INVENTION

The present invention is related to, but not limited to, the traversal of the Internet, also known as the world wide web. It specifically relates to the interaction of users of the world wide web using proxies or representations of the user in a simulated or virtual world and selection of objects within that world.

BACKGROUND OF THE INVENTION

In recent history, computers have become much more pervasive in society. In addition, they have become more powerful, faster and have significantly more storage than they did just a few short years ago. These exponential increases in speed, storage and processor power have provided the necessary infrastructure for computers to network together effectively.

The most publicized computer network in existence is referred to as the Internet. The Internet is a connection of computers using the TCP/IP protocol. This has evolved into what is now referred to as the world wide web which provides a somewhat cognitive interface into the Internet. The world wide web allows users to access information by indicating the location of the information which they desire to retrieve or by traversing hyper-text links which cross-reference information in many different locations. This is made possible by the implementation of a universal resource locator (URL) as a way of locating information on the world wide web.

Many products have been developed which assist the user in searching the web for information. Access to the world wide web can be accomplished very inexpensively using a phone line, an inexpensive computer and a software program called a web browser such as Netscape's Navigator. This ability to inexpensively connect into the world wide web has encouraged its use for much more than business purposes. The world wide web is used for educational research, shopping, games, making reservations, trading stock and numerous other purposes. Children, as well as adults, are frequent users of the world wide web.

While it was the advent of two dimensional graphically intense web sites that spurred the popularity of the Internet, the next level of technology may bring Internets, internal networks such as intranets, and networks in general to a new level. The intent of this phase of Internet development has been to render web sites sensually. That is, a user interacts with or exists within a site and experiences and perceives the site from within. This is referred to as Virtual Reality and is intended to perceptualize the network or to have the network rendered to humans with more of their senses. It puts the user in the center of the Internet.

While Virtual Reality is still in its infancy, it traditionally uses computer simulations containing three-dimensional (3D) graphics and devices to allow the user to interact with the simulation. Much of what the user has been able to browse as "data" on the web may be able to be 'experienced' as a 3D web site in the future. 3D web sites are constructed with a Virtual Reality Modeling Language, herein referred to as VRML, which allows for the design and implementation of platform-independent scene descriptions. VRML is a file format for describing interactive 3D objects and worlds to be experienced on the world wide web utilizing HTTP (A HyperText Transfer Protocol used on the Internet) in its implementation.

In today's virtual reality environments when a user enters a virtual world they take on a character persona known as the user's avatar. While the user is present in the world the user sees through the eyes of the avatar as they communicate with other avatars. The user can also signal the avatar to execute a range of emotions or actions that are viewable by any avatars looking their direction.

There also exist many objects, other than avatars, that users can interact with while traversing a virtual world. These other objects incorporate varying levels of function that allow them to enhance a user's virtual experience. For example, a virtual dog may exhibit a high-degree of programmatic interaction with an avatar even though it is not controlled by another user. This includes possibly performing tricks once selected by a user. In contrast, a virtual dog house may exhibit less functionality; possibly only activating a doghouse light when a user selects it.

This concept of selecting an object and it providing feedback when selected is a key element of truly immersive virtual worlds. Also, due to the large number of objects present in a given virtual world scene, the selection process is necessary to focus interactions and avoid unnecessary execution of actions by all objects within a user's view. Such focusing of interactions is currently possible through the use of pointing device selection. In other words, when a user sees a dog in a dog house, the user can mouse click on the dog to prompt interaction with the dog. In this sense, the user and dog have entered into an interactive relationship. Generally, that relationship continues until the user selects another object to interact with.

A basic capability offered in some virtual world implementations is that of proximity sensors. These proximity sensors are set programmatically by an object to generate a proximity event when an avatar comes within a certain distance of the object. Such proximity events can be used by an object to signal selection similar to the mouse click described above. The result is that a user can begin interacting with the virtual dog by moving within that dog's proximity sensor range. This is a desirable next step in creating intuitive worlds, but it also creates some new and complex problems.

When multiple objects, such as the dog and the dog house, incorporate proximity sensors the user will experience the effect of overlapping proximity sensors whereby each object thinks they have been selected. Thus, current selection by proximity approaches are limited to either minimizing the functional objects in a virtual area or accepting the effects of simultaneously establishing interactive relationships with multiple objects. An initially promising improvement is to define extremely small sensor ranges which at least minimize the number of objects likely to be simultaneously triggered. However, a significant problem that arises with such an approach is that the resulting proximity is too close for a user to appreciate the visual aspects of the interactive relationship they create. In other words, even if the selected dog performs tricks, the user has been forced to move too close to the dog to adequately view the interaction. Further, approaching a dog laying in a dog house will trigger selection of the dog and the house regardless of how small the sensor ranges are defined. These problems limit the use of selection by proximity and thus limit the resulting immersiveness of today's virtual worlds.

SUMMARY OF THE INVENTION

The present invention addresses the two problems with today's proximity selection through the use of multiple proximity sensors and algorithms to distinguish selection, de-selection and re-selection events. With respect to single object selection, inner and outer selection ranges are defined to allow enhanced interaction after selection. Further, the present invention uses these new selection ranges to manage overlapping proximity ranges for multiple objects. The resulting selection capability distinctly exceeds what is available in the present state of virtual world interaction solutions.

The present invention defines single object selection through the use of inner and outer selection ranges. An inner selection range is used by an object to define the distance at which an incoming avatar would trigger a selection event and thus prompt an interactive relationship. The outer selection range is used by an object to define the distance that an avatar can retreat to after selection and still maintain the interactive relationship. Once an avatar moves beyond the outer selection range, the object receives a de-selection event. This approach allows, for example, a user to move close to a virtual dog and trigger selection. In addition, however, the user is able to move away from the dog to view interactions, provided the user does not move beyond the outer selection range. This approach of multiple selection ranges allows the user to interact much like the real world where people are able to step closely to introduce themselves and then step back while continuing a conversation.

The present invention defines a process for managing inner and outer selection ranges both at a virtual object level and at a virtual world framework level. Thus, programmers of virtual objects can benefit even if their platform world does not incorporate framework improvements for this capability. By using a scheme of proximity sensor bookkeeping and state transitions, an object can decide what proximity events are actually selection events. More particularly, objects can keep track of whether they are currently selected and monitor proximity events to manipulate that state. This is best described in discussion of the preferred embodiment where the algorithm implementation is detailed.

A more robust incorporation of the present invention involves virtual world framework enhancements. Such enhancements allow objects to create selection sensors rather than proximity sensors. All the virtual object then monitors is selection, de-selection or re-selection events sent from the framework. No determination is needed at the virtual object level to transform proximity events into selection events. Moving the transformation up a level to the framework also yields important sensor management benefits that are not possible when management is left to individual virtual objects. This is where the present invention is able to improve on overlapping sensor problems inherent in existing technology.

The present invention defines a framework method for handling inner and outer selection ranges that minimizes the number of proximity sensors managed in the entire system. By defining an infinite range proximity sensor as defined by today's virtual world languages, the framework can monitor movement of all objects in the world. Once an object registers inner and outer selection ranges with the framework, the framework proceeds to monitor avatar movements and triggers selection events when an avatar enters an object's inner selection range. The framework then sends a de-selection event whenever the avatar moves beyond the outer selection range. Thus, by framework enhancements, an avatar is able to move close enough to select an object and then step back to perceive the interactive relationship.

In addition to the standard sensor management described above, a framework implementing the present invention applies an algorithm for resolving overlapping sensor ranges. Although the preferred embodiment provides a detailed look at a couple notable results of this algorithm, a short example is provided here for clarity. When the framework determines that an avatar has entered a virtual object's (A) inner selection range, the framework checks to see if that avatar currently has an interactive relationship with another object (B). If so, the framework sends a selection event to A and a de-selection event to B. Then, when the avatar retreats from A beyond its outer selection range, the framework sends a de-selection event to A and a re-selection event to B. If the avatar continues moving to beyond B's outer selection range then the framework sends B a de-selection event. The present invention defines a re-selection event rather than re-using a general selection event because objects may wish to interact differently if a user never left their inner selection range. Further, for added flexibility, the present invention defines a re-select flag which can be cleared to disallow any re-selection events on exit from inner selection ranges. This may be useful to simplify exiting of interactive relationships. When the flag is set, exiting movement could generate repeated re-selection events when a user would rather just quickly step away and end all interactions. This is discussed in the preferred embodiment along with an alternative approach through proper outer selection range definitions.

The preferred embodiment describes proximity and selection ranges in shapes of circles formed by a center point and radius. It is important to note that the present invention does not require proximity sensors to operate with any particular geometry. In other words, the proximity sensor could create an invisible circle or sphere around the object that generates proximity events when crossed. Further, the proximity range could involve non-symmetric complex shapes, and generate proximity events whenever the range is crossed. The process necessary for creating such complex proximity ranges is not defined by the present invention. Rather, the present invention merely depends on manipulating proximity events that can be generated by any number of proximity range implementations. The use of circular proximity ranges in the preferred embodiment is not intended to limit the present invention with regard to proximity sensor choice.

DETAILED DESCRIPTION OF THE PREFERRED EMBODIMENT

The preferred embodiment of the present invention is implemented using VRML in a virtual world. An avatar is implemented to represent a user, or one or more aspects of a user, in a virtual world. An example used in describing enhanced selection by proximity is one where a user (USER1) encounters a virtual dog in a virtual world through the use of an avatar (AVATAR1). The surroundings of the preferred embodiment is the backyard of a virtual house existing in a virtual world visited by the user; although a virtual world could be created to be any perceived world, both those mimicking our reality and those of science fiction.

Figure 1:
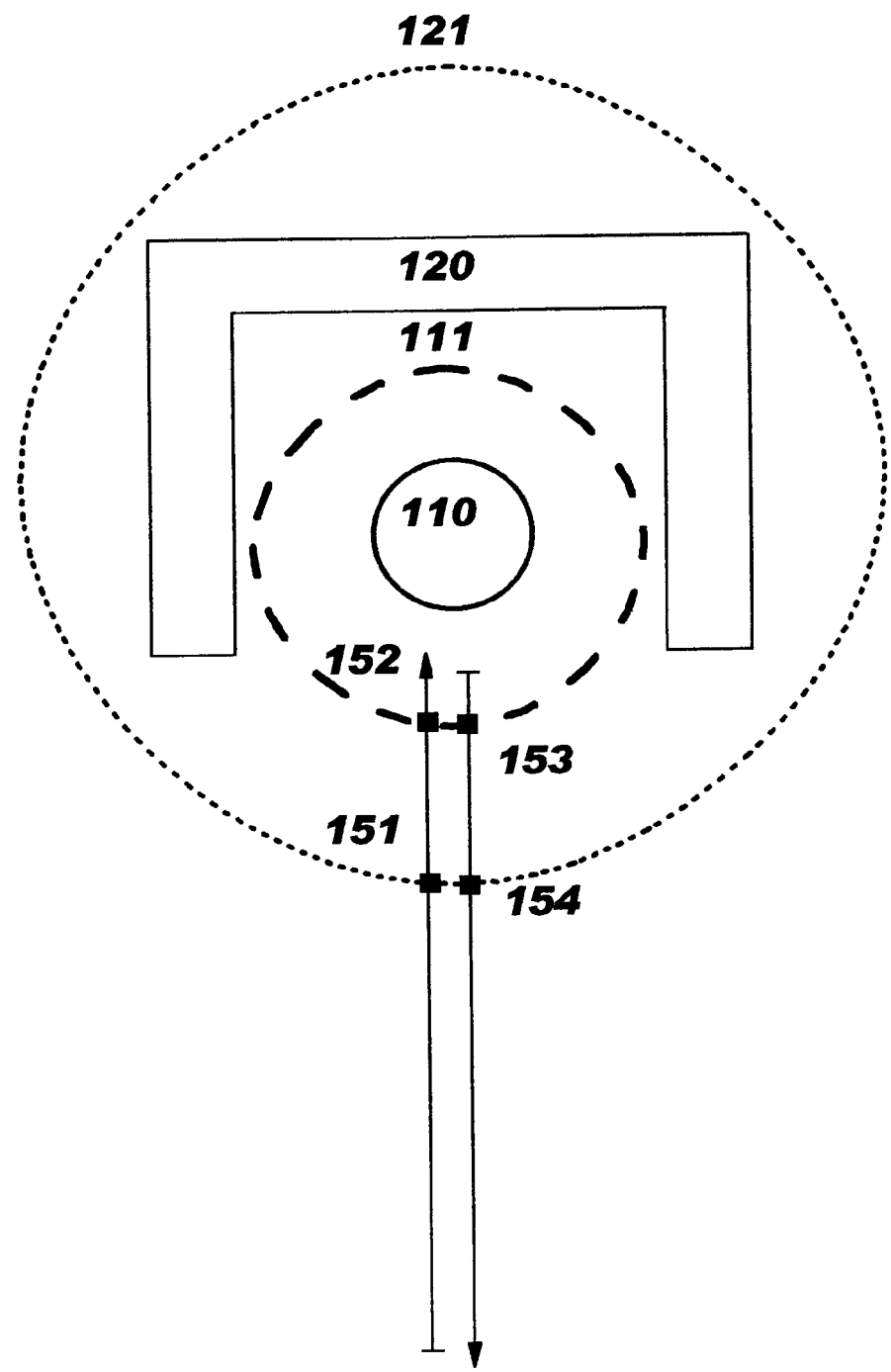
FIG. 1 depicts some of the difficulties presented by the prior art dependence upon single proximity sensors to facilitate selection and interaction with multiple objects.

The interaction diagrams presented in FIGS. 1, 2, 5 and 6 focus on the objects, proximity ranges and selection ranges used in a typical avatar-object interaction. Each diagram outlines events of importance as an avatar passes various sensors registered by a virtual object. Note in particular the use of "proximity sensors" and "selection sensors" as two functionally different entities. "Proximity sensors" generate a proximity event regardless of object states. "Selection sensors" generate selection events dependent upon object states. FIG. 1 demonstrates how selection takes place and problems presented using the prior art technology for object interaction. Before the sequence begins, the virtual dog object (110) and the virtual doghouse (120) objects each create a proximity sensor to trigger selection; sensors 111 and 121 respectively. As AVATAR1 moves towards both objects, it passes sensor 121 and the doghouse receives a proximity event (151). As a result, the doghouse enters a "selected" state and begins an interactive relationship with AVATAR1. In this state, the doghouse executes functions such as flashing a light and generating a dog whistle. The dog has not been selected yet and thus is seen to be sitting quietly.

As AVATAR1 continues to move toward both objects, it passes sensor 111 and the dog receives a proximity event (152). As a result, the dog enters a "selected" state and begins an interactive relationship with AVATAR1. In this state, the dog executes functions such as wagging its tail and rolling over. USER1, however, cannot see this interaction as sensor 111 was defined as being six virtual inches from the dog and AVATAR1 is too close for USER1 to witness the dog's antics. The most likely reason for such a small proximity range is to avoid AVATAR1 triggering other proximity ranges; for example if multiple dogs were sitting closely. In addition to this viewing difficulty, the small range still cannot address the simultaneous doghouse selection, since AVATAR1 remains within sensor 121 and the doghouse remains selected. Therefore, USER1 has achieved selection by proximity but she is left with multiple selections and a useless viewing distance for the dog's interactive relationship.

Now that USER1 has selected the dog she can decide whether to continue interaction or to leave. Possibly to get a better view of the dog, AVATAR1 may move away from the objects which triggers another proximity event (153) for the dog. On receiving this proximity event, the dog determines its present state and shifts back to a "de-selected" state. Thus, the dog stops its interactive functions and again appears to be sitting quietly. The doghouse is still selected and thus is continuing its interactive relationship through flashing lights and a dog whistle.

Figure 2:
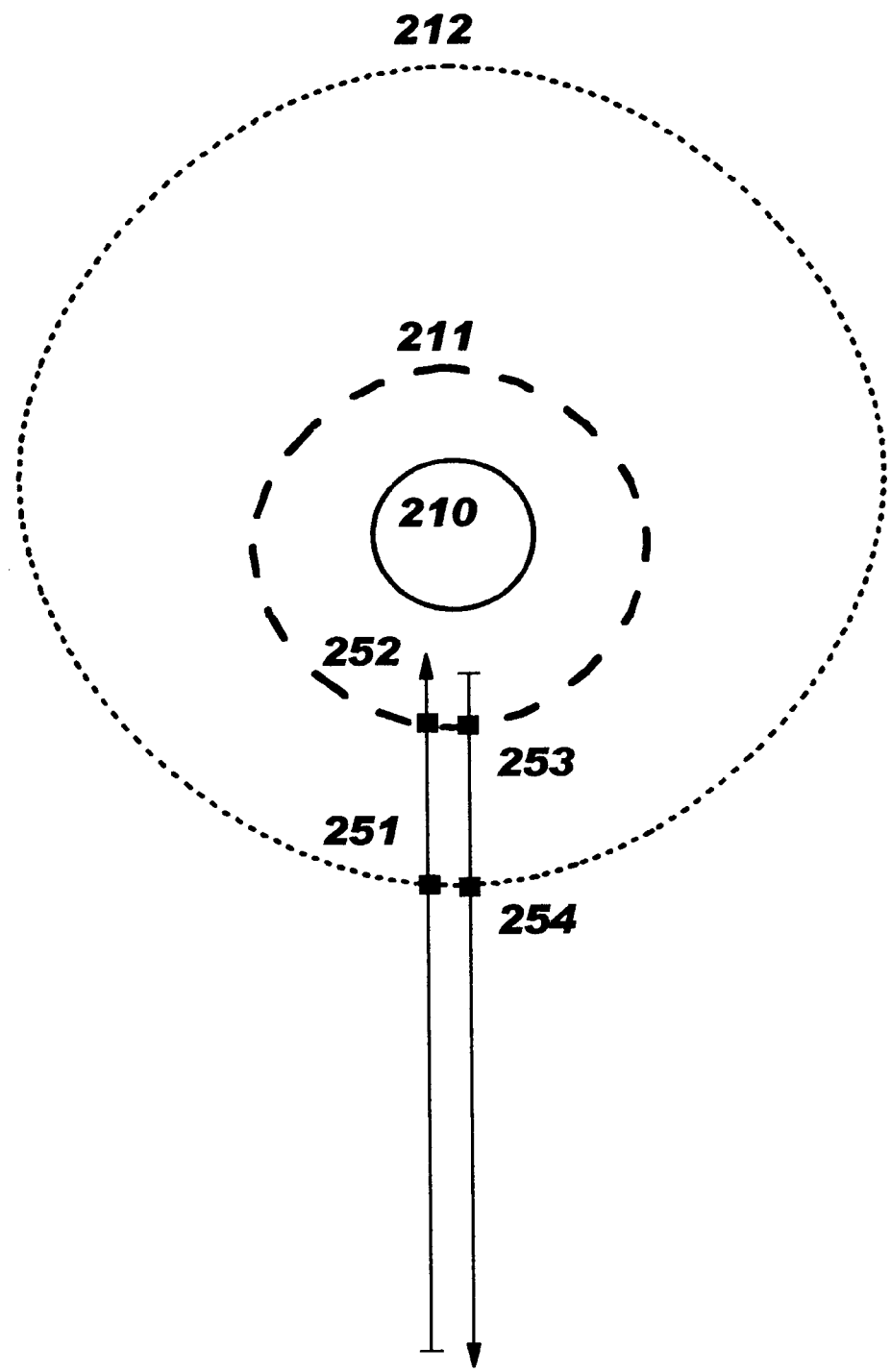
FIG. 2 presents a visual representation of an object using inner and outer selection ranges as defined by the present invention.
Figure 5:
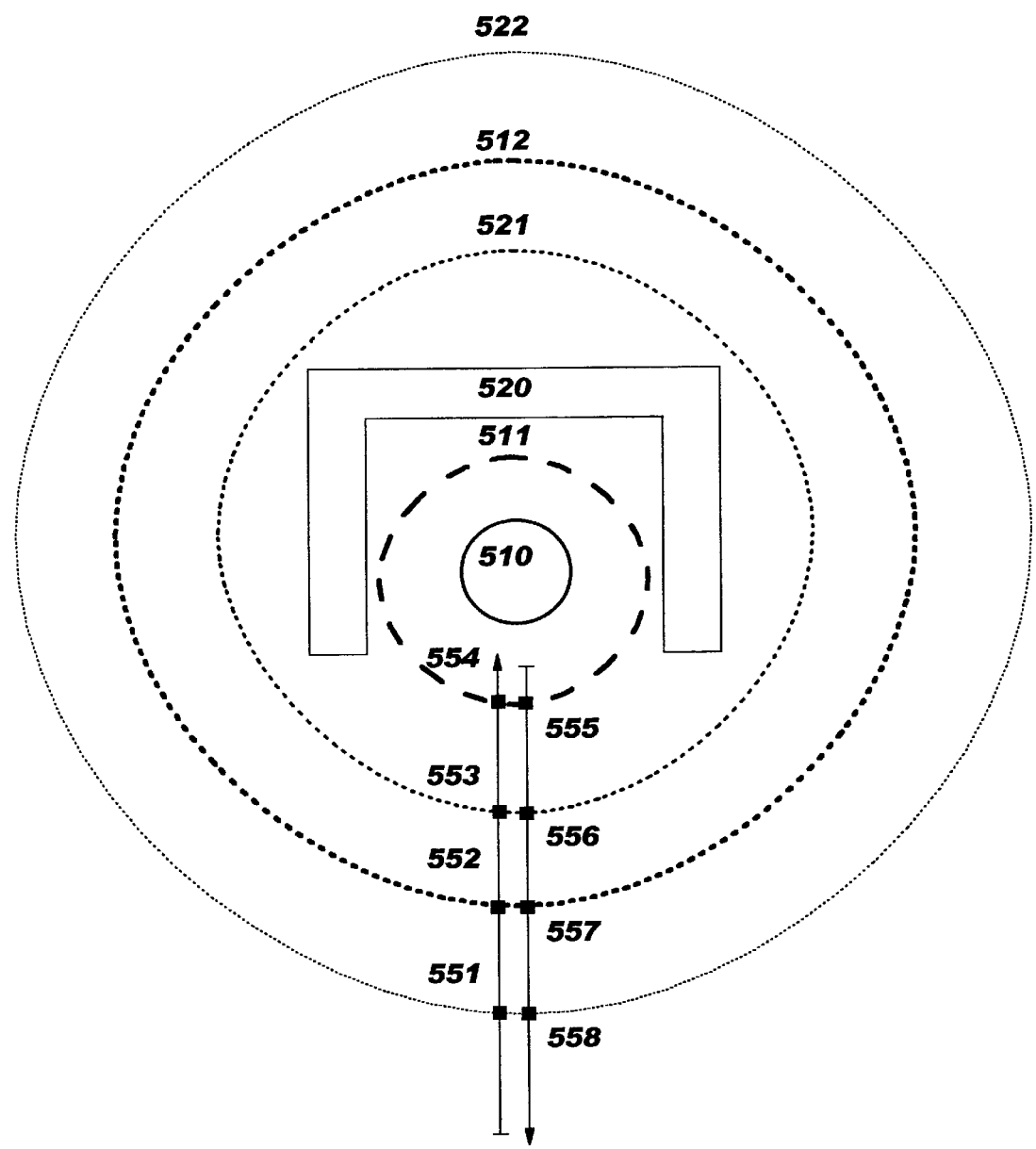
FIG. 5 depicts the results and management necessary when virtual objects have overlapping selection ranges.

As AVATAR1 continues to move away from the objects it triggers another proximity event (154) for the doghouse. On receiving this proximity event, the doghouse determines its present state and shifts back to a "de-selected" state. Thus, the doghouse stops its interactive functions such as the light and whistle. From this point, AVATAR1 is not in an interactive relationship with any other object and it continues to navigate in the virtual world. Although USER1 achieved rudimentary proximity by selection, the prior art approach is lacking in this scenario of multiple object selection management. FIGS. 2 and 5 demonstrate similar scenarios and how the present invention greatly improves the interactive experience for USER1.

Figure 3:
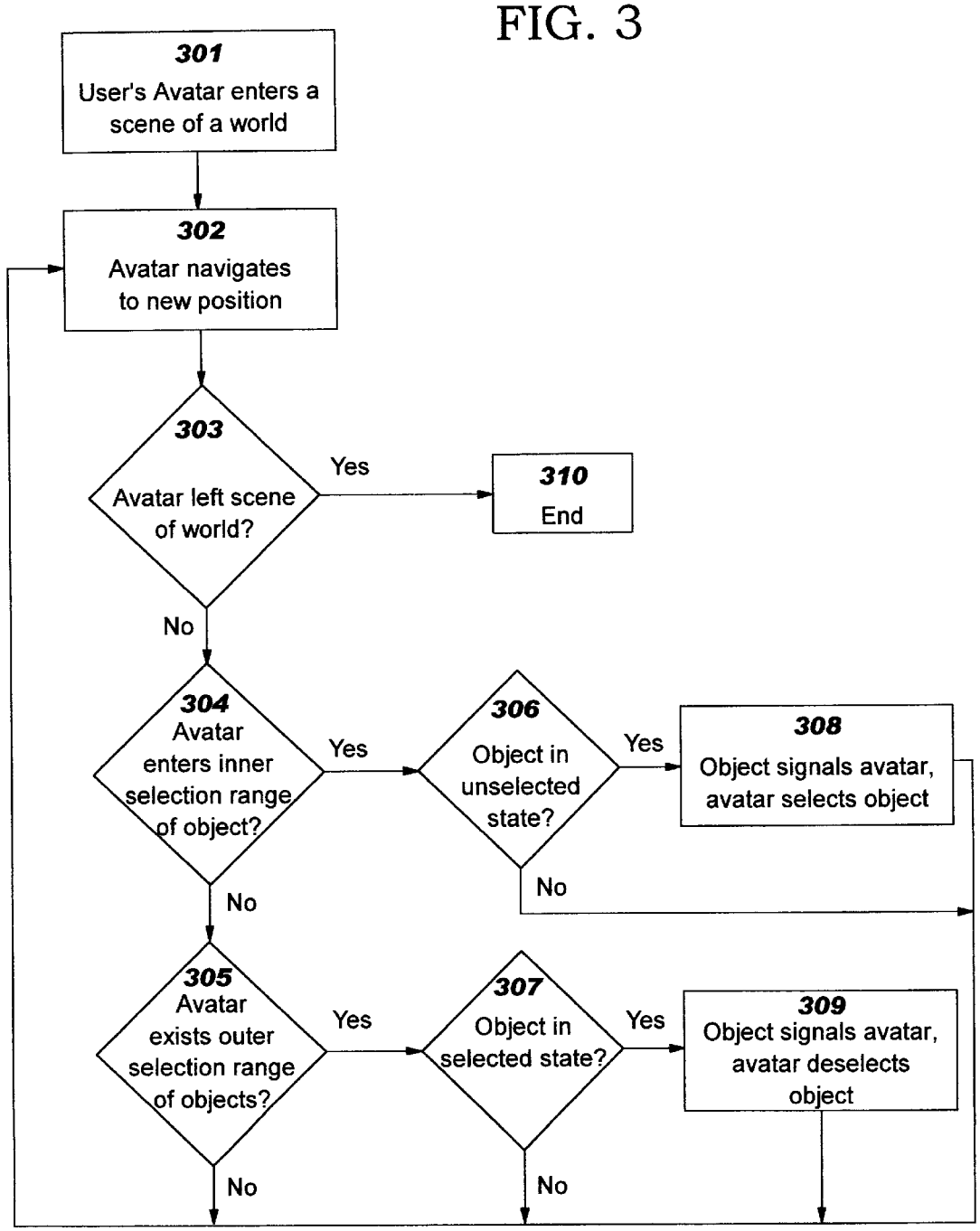
FIG. 3 depicts the flows required to manage inner and outer selection ranges when implementing the present invention in a virtual object.
Figure 4:
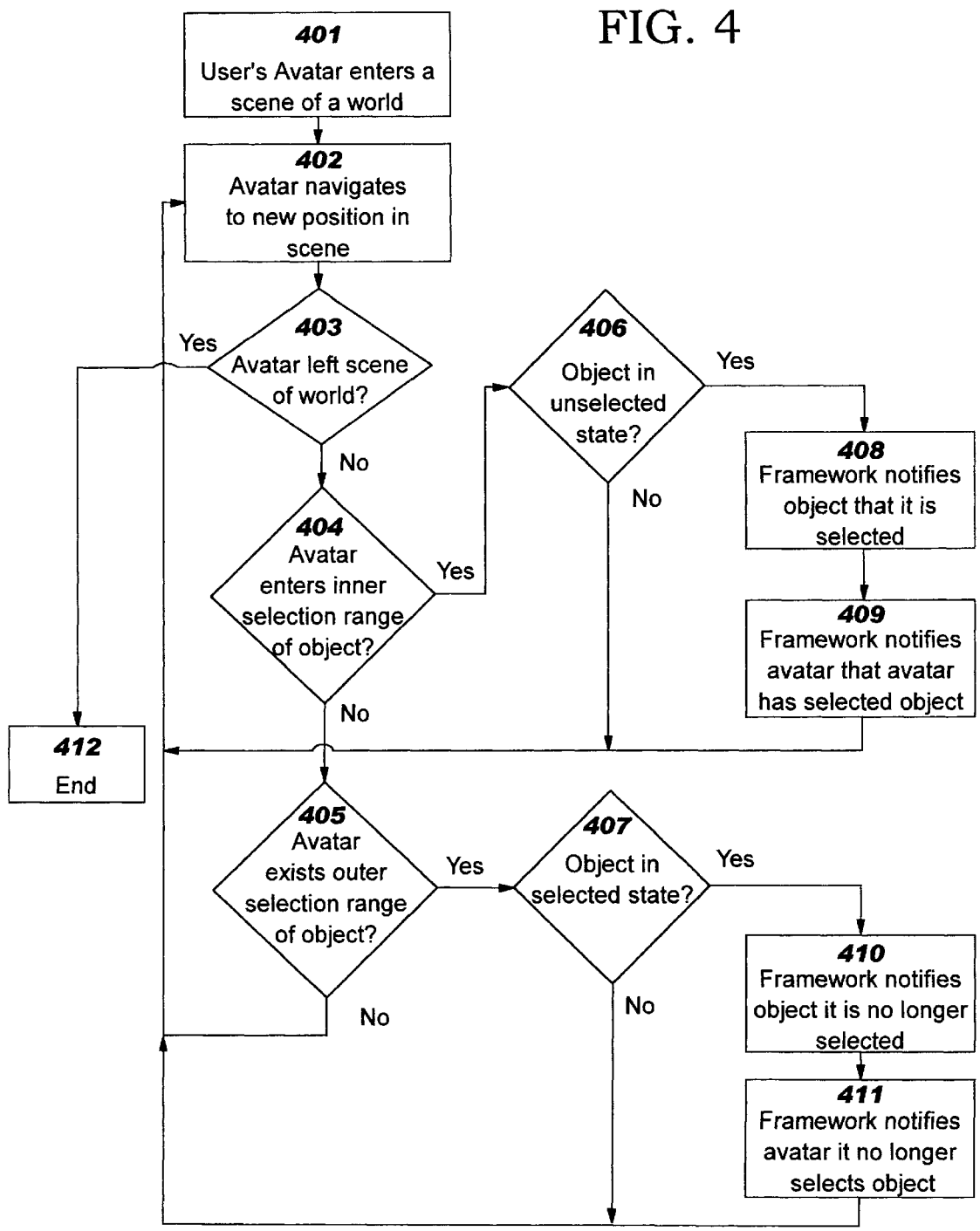
FIG. 4 depicts the flows required to manage inner and outer selection ranges when implementing the present invention in a virtual world framework.
Figure 6:
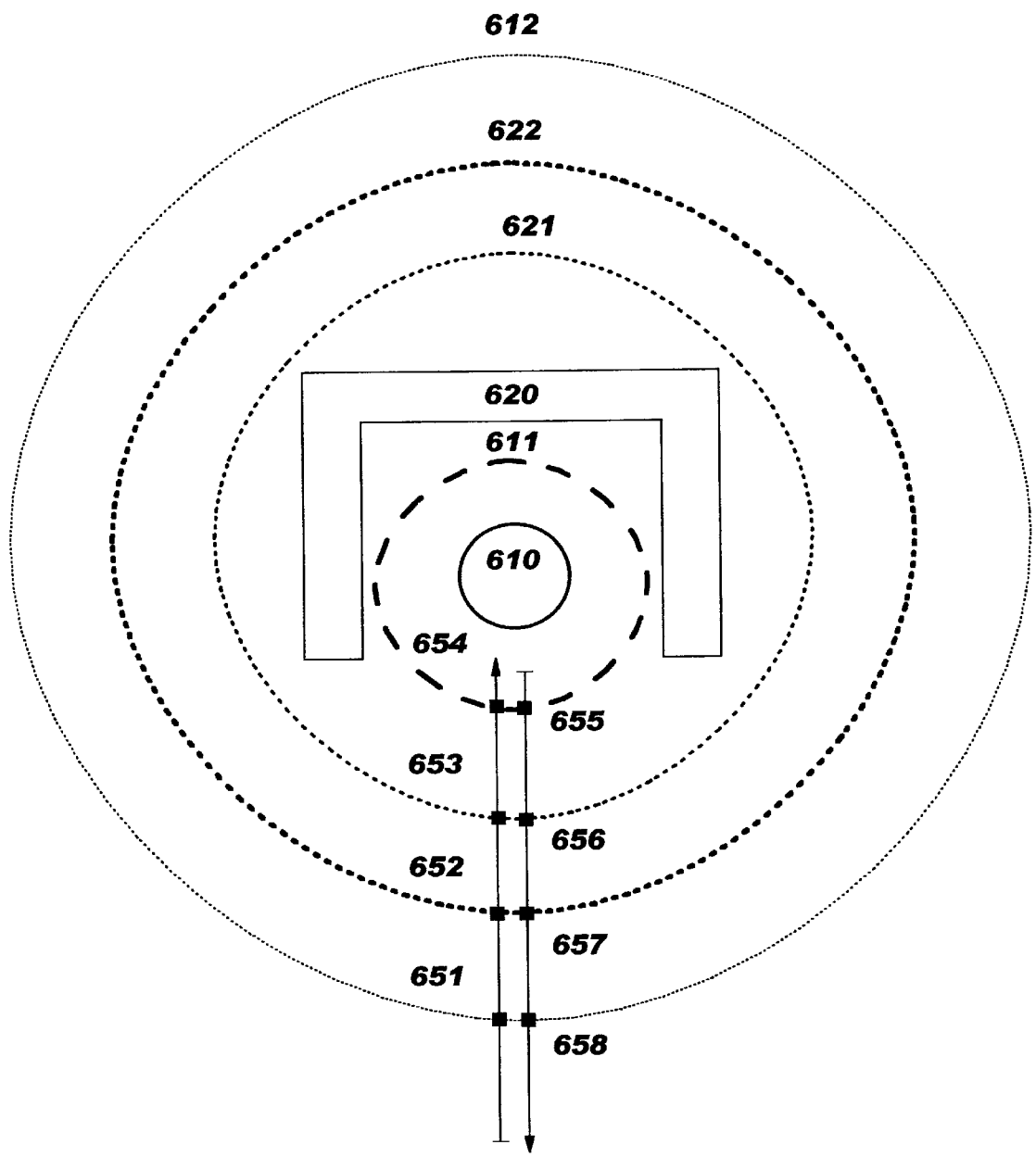
FIG. 6 depicts a special case where outer selection ranges can define whether re-selection occurs to contrast the re-selection flag of the present invention.

The present invention adds a level of complexity by defining inner and outer selection sensors. Therefore, for clarity, FIG. 2 depicts an interaction diagram involving only one object and its sensors. FIGS. 5 and 6 deal with multi-object and multi-sensor management as defined by the present invention. The key problem and solution displayed in FIG. 2 is where selection is desired by close proximity but USER1 still wants to be able to view the interaction adequately. Before the sequence begins, the virtual dog object (210) object creates an inner and outer selection sensor to trigger selection; sensors 211 and 212 respectively. As defined by the present invention, equivalent sensor functions can be managed by the virtual object or by the virtual world framework. FIGS. 3 and 4 describe the difference between these two implementations. For the purposes of FIG. 2, one can assume that the framework manages these selection sensors. As AVATAR1 moves towards the dog, it passes outer selection sensor 212 which does not trigger any selection event (251). This is because outer selection sensors are used for de-selection purposes. The dog has not been selected yet and thus is seen to be sitting quietly.

As AVATAR1 continues to move towards the dog, it passes inner sensor 211 and the dog receives a selection event (252). As a result, the dog enters a "selected" state and begins an interactive relationship with AVATAR1. In this state, the dog executes functions such as wagging its tail and rolling over. At this point USER1 cannot see this interaction as sensor 211 was defined as being six virtual inches from the dog and AVATAR1 is too close for USER1 to witness the dog's antics. The most likely reason for such a small proximity range is to avoid AVATAR1 triggering other proximity ranges; for example if multiple dogs were sitting closely. Fortunately, however, the dog is using the present invention.

As AVATAR1 moves back to get a better view of the dog, AVATAR1 passes inner selection sensor 211 which does not trigger any "de-selection" event (253). This is because inner selection sensors are used only for selection purposes. At this point the dog is performing its interactive functions and AVATAR1 is far enough away to provide USER1 an adequate view. Once USER1 decides to end the interactive relationship she can continue to move AVATAR1 away to prompt de-selection. As AVATAR1 continues moving away, outer selection sensor 212 is passed and the dog receives a "de-selection" event (254). As a result, the dog returns to a "de-selected" state. Thus, the dog stops its interactive functions and again appears to be sitting quietly.

The present invention is simplest to explain using simultaneous inner and outer selection sensors. Those technically skilled in the art will recognize that two simultaneous sensors are not needed for this capability. In fact, the present invention further defines dynamic inner and outer selection sensors. With such an approach, outer selection sensor 212 is created only after inner selection sensor 211 is crossed and deleted. This allows for equivalent function while minimizing the number of sensors used. Once outer selection sensor 212 triggers a "de-selection" event, it recreates inner selection sensor 211 and 212 is deleted. The use of two simultaneous selection sensors in FIG. 2 is not intended to limit the present invention with regard to selection sensor flexibility.

FIG. 3 depicts the preferred embodiment when the present invention is implemented in the virtual object rather than the virtual world framework. FIG. 4 depicts the steps necessary for implementation in a virtual world framework. Before the sequence depicted in FIG. 3 begins, objects in the virtual world such as the dog, register inner and outer proximity sensors with the virtual world framework. Note that proximity sensors have no attribute of inner or outer, thus the object keeps track of which proximity sensors correlate to inner or outer signals. FIG. 3 begins with AVATAR1 entering the virtual world (301). Then USER1 navigates AVATAR1 to a new position in that world (302). Determination step 303 decides whether AVATAR1 has left the scene of the virtual world. If so, movement and selection processing is complete and step 310 ends the process. However, if AVATAR1 has not left the scene then determination step 304 decides whether AVATAR1 crossed the dog's inner proximity range. If so, the dog receives a proximity event from the inner proximity sensor and determination step 306 of the dog decides whether the current state is "un-selected." If "unselected," the dog signals the AVATAR1 of a new selection and changes state accordingly (308). Once the selection state is changed, or the dog was already selected, processing returns to determination step 302 to monitor further navigation. If AVATAR1 did not enter an inner proximity range then determination step 305 decides whether AVATAR1 crossed the dog's outer proximity range. If so, the dog receives a proximity event from the outer proximity sensor and determination step 307 of the dog decides whether the current state is "selected." if "selected," the dog signals AVATAR1 of a de-selection and changes state accordingly (309). Once the selection state is changed, or the dog was not currently selected, processing returns to determination step 302 to monitor further navigation.

FIG. 4 depicts the preferred embodiment when the present invention is implemented in the virtual world framework. Before the sequence depicted in FIG. 4 begins, objects in the virtual world such as the dog, register inner and outer selection sensors with the virtual world framework. FIG. 4 begins with AVATAR1 entering the virtual world (401). Then USER1 navigates AVATAR1 to a new position in that world (402). Determination step 403 decides whether AVATAR1 has left the scene of the virtual world. If so, movement and selection processing is complete and step 412 ends the process. However, if AVATAR1 has not left the scene then determination step 404 decides whether AVATAR1 crossed the dog's inner selection range. If so, determination step 406 of the framework decides whether the dog's current state is "un-selected." If "un-selected," the framework sends the dog a "selection" event (408). The framework then notifies AVATAR1 that it has entered an interactive relationship with the dog (409). Once the selection state is changed, or the dog was already selected, processing returns to determination step 402 to monitor further navigation. If AVATAR1 did not enter an inner selection range then determination step 405 decides whether AVATAR1 crossed the dog's outer selection range. If so, determination step 407 of the framework decides whether the dog's current state is "selected." If "selected," the framework sends the dog a "de-selection" event (410). The framework then notifies AVATAR1 that it has exited an interactive relationship with the dog (411). Once the selection state is changed, or the dog was not currently selected, processing returns to determination step 402 to monitor further navigation.

FIGS. 5 and 6 depict selection diagrams when multiple objects are involved. Most decisions are the same as with a single object, however, an additional selection event, "re-selection," is used and de-selection can occur even when not crossing an outer selection range. Further, the examples are used to demonstrate implications of setting inner and outer selection ranges at varied distances.

Before the FIG. 5 sequence begins, the virtual dog (510) and virtual doghouse (520) objects create inner and outer selection sensors to trigger selection. Sensors 511 and 512 are the dog's inner and outer selection sensors, respectively. Sensors 521 and 522 are the doghouse's inner and outer selection sensors, respectively. As defined by the present invention, equivalent sensor functions can be managed by the virtual object or by the virtual world framework. For the purposes of FIGS. 5 and 6, one can assume that the framework manages these selection sensors. As AVATAR1 moves towards the objects, it passes the doghouse's outer selection sensor 522 which does not trigger any "selection" event (551). This is because outer selection sensors are used for de-selection purposes. The same is true as AVATAR1 passes the dog's outer selection sensor 512 which does not trigger any "selection" event (552). However, once AVATAR1 passes the doghouse's inner selection sensor 521 the doghouse receives a "selection" event (553). As a result, the doghouse enters a "selected" state and begins an interactive relationship with AVATAR1. In this state, the doghouse executes functions such as flashing a light and generating a dog whistle. The dog has not been selected yet and thus is seen to be sitting quietly.

As AVATAR1 continues to move toward both objects, it passes sensor 511 and the dog receives a "selection" event (554). As a result, the dog enters a "selected" state and begins an interactive relationship with AVATAR1. In this state, the dog executes functions such as wagging its tail and rolling over. Further, to combat the problems of simultaneous interactive relationship, the doghouse receives a "de-selection" event at the same time (554). Therefore, AVATAR1 is left in an interactive relationship with the single object which was most recently selected. This result is a close approximation of real-life interactions, and thus aids the immersive effect of the virtual world using the present invention.

As AVATAR1 moves back to get a better view of the dog, AVATAR1 passes the dog's inner selection sensor 511 which does not trigger any "de-selection" event (555). This is because inner selection sensors are used only for selection purposes. The same is true as AVATAR1 passes the doghouse's inner selection sensor 521 which does not trigger any "selection" event (556). At this point the dog is performing its interactive functions and AVATAR1 is far enough away to provide USER1 an adequate view. Once USER1 decides to end the interactive relationship she can continue to move AVATAR1 away to prompt de-selection. As AVATAR1 continues moving away, the dog's outer selection sensor 512 is passed and the dog receives a "de-selection" event (557). As a result, the dog returns to a "de-selected" state. Thus, the dog stops its interactive functions and again appears to be sitting quietly. Further, because AVATAR1 is within the doghouse's outer selection range 522, the doghouse receives a "re-selection" event (557). In this manner, AVATAR1 is able to adjust its interactive relationships by moving back. As AVATAR1 continues to move away from the objects it passes the doghouse's outer selection sensor (522) and the doghouse receives a "de-selection" event (558).

FIG. 6 presents a selection diagram where outer selection sensors have been defined in a manner to minimize "re-selection" events. This may be desirable for a user that wishes to leave an interaction without re-entering interactive relationships on the way out. The Figure uses outer sensor distance to accomplish this effect whereas the present invention also defines an enhanced method: a "re-selection" flag.

Before the FIG. 6 sequence begins, the virtual dog (610) and virtual doghouse (620) objects create inner and outer selection sensors to trigger selection. Sensors 611 and 612 are the dog's inner and outer selection sensors, respectively. Sensors 621 and 622 are the doghouse's inner and outer selection sensors, respectively. As AVATAR1 moves towards the objects, it passes the dog's outer selection sensor 612 which does not trigger any "selection" event (651). This is because outer selection sensors are used for de-selection purposes. The same is true as AVATAR1 passes the doghouse's outer selection sensor 622 which does not trigger any "selection" event (652). However, once AVATAR1 passes the doghouse's inner selection sensor 621 the doghouse receives a "selection" event (653). As a result, the doghouse enters a "selected" state and begins an interactive relationship with AVATAR1. In this state, the doghouse executes functions such as flashing a light and generating a dog whistle. The dog has not been selected yet and thus is seen to be sitting quietly.

As AVATAR1 continues to move toward both objects, it passes sensor 611 and the dog receives a "selection" event (654). As a result, the dog enters a "selected" state and begins an interactive relationship with AVATAR1. In this state, the dog executes functions such as wagging its tail and rolling over. Further, to combat the problems of simultaneous interactive relationships, the doghouse receives a "de-selection" event at the same time (654). Therefore, AVATAR1 is left in an interactive relationship with the single object which was most recently selected. This result is a close approximation of real-life interactions and thus aids the immersive effect of the virtual world using the present invention.

As AVATAR1 moves back to get a better view of the dog, AVATAR1 passes the dog's inner selection sensor 611 which does not trigger any "de-selection" event (655). This is because inner selection sensors are used only for selection purposes. The same is true as AVATAR1 passes the doghouse's inner selection sensor 621 which does not trigger any "selection" event (656). At this point the dog is performing its interactive functions and AVATAR1 is far enough away to provide USER1 an adequate view. Once USER1 decides to end the interactive relationship she can continue to move AVATAR1 away to prompt de-selection. As AVATAR1 continues moving away, the doghouse's outer selection sensor 622 is passed which does not trigger any "de-selection" event (657). This is because the doghouse was still in a "de-selected" state from 654. As AVATAR1 continues to move away from the objects it passes the dog's outer selection sensor (612) and the dog receives a "de-selection" event (658). Note that no re-selection occurred because the inner object, the dog, defined an outer selection sensor that was beyond the doghouse's outer selection sensor.

This is one way to avoid repeated re-selections on the way out of an interactive relationship. However, it depends on the objects defining their sensors in a preferred manner. Instead, to provide more control to users, the present invention defines an avatar "re-selection" flag that must be set in order to trigger re-selections. Thus, if USER1 cleared AVATAR1's "re-selection" flag, then the framework would never generate re-selection messages to objects as AVATAR1 passed outer selection sensors.

What is claimed is:

1. A method of selecting a virtual object by proximity in a virtual world and maintaining an interactive relationship with the virtual object, the method comprising the steps of:

defining two logical proximity ranges for the virtual object, wherein a first of the logical proximity ranges is an inner logical proximity range and a second of the logical proximity ranges is an outer logical proximity range, the inner logical proximity range being located at a first distance from the virtual object and corresponding to selection of the virtual object while the outer logical proximity range is located at a second distance from the virtual object and corresponds to de-selection of the virtual object, the second distance being further away from the virtual object than the first distance;

registering an inner logical proximity sensor at the inner logical proximity range;

registering an outer logical proximity sensor at the outer logical proximity range; and using the inner logical proximity range and the outer logical proximity range in concert to manage activation of the virtual object, further comprising the steps of:

generating a selection event when inner logical proximity sensor is triggered by an avatar navigating in the virtual world;

activating the virtual object when the selection event is generated and the virtual object is not in a selected state;

generating a de-selection event when the outer logical sensor is triggered by the avatar navigating in the virtual world; and de-activating the virtual object when the de-selection event is generated and the virtual object is not in an un-selected state.

2. The method as claimed in claim 1, wherein the generating of the selection event is performed by the virtual object, and wherein the activating step further comprises the steps of:

receiving, by the virtual object, the generated selection event;

determining whether the virtual object is in the un-selected state for the avatar; and if the virtual object is in the un-selected state, setting the virtual object to be in the selected state for the avatar and activating the virtual object, and ignoring the received selection event otherwise.

3. The method as claimed in claim 2, further comprising the step of communicating the selected state to a virtual world framework after setting the virtual object to be in the selected state.

4. The method as claimed in claim 3, wherein the communicating step comprises storing the selected state as a virtual object state by the virtual world framework and forwarding the selected state to the avatar.

5. The method as claimed in claim 1, wherein the generating of said de-selection event is done by the virtual object, and wherein the de-activating step further comprises the steps of:

receiving, by the virtual object, the generated de-selection event;

determining whether the virtual object is in the selected state for the avatar; and if the virtual object is in the selected state, setting the virtual object to be in the un-selected state for the avatar and de-activating the virtual object, and ignoring the received de-selection event otherwise.

6. The method as claimed in claim 5, further comprising the step of communicating the un-selected state to a virtual world framework after setting the virtual object to be in the un-selected state.

7. The method as claimed in claim 6, wherein the communicating step comprises storing the un-selected state as a virtual object state by the virtual world framework and forwarding the un-selected state to the avatar.

8. The method as claimed in claim 1, wherein the generating of the selection event is done by a virtual world framework, and wherein the generating step further comprises the steps of:

receiving, by the virtual world framework, the generated selection event;

determining whether the virtual object is in the un-selected state for the avatar; and if the virtual object is in the un-selected state, setting the virtual object to be in the selected state for the avatar, activating the virtual object and notifying the virtual object of the selected state, and ignoring the received selection event otherwise.

9. The method as claimed in claim 8, further comprising the step of communicating the selected state to the avatar after setting the virtual object to be in the selected state.

10. The method as claimed in claim 8, wherein the setting step further comprises the steps of:

determining whether a second virtual object was already in the selected state for the avatar; and if so, setting the second virtual object to be in the un-selected state for the avatar.

11. The method as claimed in claim 1, wherein the generating of the de-selection event is done by a virtual world framework, and wherein the activating step further comprises the steps of:

receiving, by the virtual world framework, the generated de-selection event;

determining whether the virtual object is in the selected state for the avatar; and if the virtual object is in the selected state, setting the virtual object to not be in the un-selected state for the avatar, de-activating the virtual object, and notifying the virtual object of the un-selected state, and ignoring the received de-selection event otherwise.

12. The method as claimed in claim 11, further comprising the step of communicating the un-selected state to the avatar after setting the virtual object to be in the un-selected state.

13. The method as claimed in claim 11, wherein the setting step further comprises the steps of:

determining whether a second virtual object has an outer logical proximity range that the avatar remains within; and if so, setting the second virtual object to be in a re-selected state for the avatar.

14. The method as claimed in claim 11, wherein the setting step further comprises the steps of:

determining whether the avatar has a re-selection flag set on; and if the re-selection flag is set on, determining whether a second virtual object has an outer logical proximity range that the avatar remains within and, if so, setting the second virtual object to be in a re-selected state for the avatar.

15. A method for an avatar to select a virtual object by proximity of a first distance from the virtual object and maintain an interactive relationship with the virtual object within a second distance from the virtual object, wherein the second distance is further from the virtual object than the first distance, the method comprising the steps of:

defining two logical proximity ranges for the virtual object, wherein a first of the logical proximity ranges is an inner logical proximity range and a second of the logical proximity ranges is an outer logical proximity range, the inner logical proximity range being located at the first distance and corresponding to selection of the virtual object while the outer logical proximity range is located at the second distance and corresponds to de-selection of the virtual object; and using the inner logical proximity range and the outer logical proximity rang in concert to manage activation of the virtual object further comprising the steps of:

registering, by the virtual object, an inner logical proximity sensor at the inner logical proximity range;

determining when the inner logical proximity sensor is triggered by a first navigation of the avatar;

generating a selection event when the inner logical proximity sensor is triggered;

activating the virtual object when the selection event is generated and the virtual object is not in a selected state;

registering, by the virtual object, an outer logical proximity sensor at the outer logical proximity range when the selection event is generated;

determining when the outer logical proximity sensor is triggered by a subsequent navigation of the avatar;

generating a de-selection event when the outer logical proximity sensor is triggered;

de-activating the virtual object when the de-selection event is generated and the virtual object is in the selected state; and registering, by the virtual object, the inner proximity logical sensor at the inner logical proximity range when the de-selection event is generated.

16. A computer system contained within a computer network, the computer network having multiple computers connected together using telecommunications mechanisms, wherein an avatar selects a virtual object by proximity of a first distance from the virtual object and maintains an interactive relationship with the virtual object within a second distance from the virtual object, wherein the second distance is further from the virtual object than the first distance, the computer system comprising:

means for defining two logical proximity ranges for the virtual object, wherein a first of the logical proximity ranges is an inner logical proximity range and a second of the logical proximity ranges is an outer logical proximity range, the inner logical proximity range being located at the first distance and corresponding to selection of the virtual object while the outer logical proximity range is located at the second distance and corresponds to de-selection of the virtual object;

means for registering, by the virtual object, an inner logical proximity sensor at the inner logical proximity range;

means for registering, by the virtual object, an outer logical proximity sensor at the outer logical proximity range; and means for using the inner logical proximity range and the outer logical proximity range in concert to manage activation of the virtual object, further comprising:
means for determining when the inner and outer logical proximity sensors are triggered;
means for generating a selection event when the inner logical proximity sensor is triggered by a first navigation of the avatar;
means for activating the virtual object when the selection event is generated and the virtual object is not in a selected state;
means for generating a de-selection event when the outer logical proximity sensor is triggered by a subsequent navigation of the avatar; and
means for de-activating the virtual object when the de-selection event is generated and the virtual object is not in an un-selected state.

17. The computer system as claimed in claim 16, wherein operation of the means for generating the selection event is performed by the virtual object, and wherein the means for activating further comprises:
means for receiving, by the virtual object, the generated selection event;
means for determining whether the virtual object is in the un-selected state for the avatar; and
if said virtual object is in the un-selected state, means for setting the virtual object to be in the selected state for the avatar and activating the virtual object, and for ignoring the received selection event otherwise.

18. The computer system as claimed in claim 16, wherein operation of the means for generating the de-selection event is done by the virtual object, and wherein the means for de-activating further comprises:
means for receiving, by the virtual object, the generated de-selection event;
means for determining whether the virtual object is in the selected state for the avatar; and
if the virtual object is in the selected state, means for setting the virtual object to be in the un-selected state for the avatar and de-activating the virtual object, and for ignoring the received de-selection event otherwise.

19. The computer system as claimed in claim 16, wherein operation of the means for generating the selection event is done by a virtual world framework, and wherein the means for activating further comprises:
means for receiving, by the virtual world framework, the generated selection event;
means for determining whether the virtual object is in the un-selected state for the avatar; and
if said virtual object is in the un-selected state, means for setting the virtual object to be in the selected state for the avatar, activating the virtual object, and notifying the virtual object of the selected state, and for ignoring the received selection event otherwise.

20. The computer system as claimed in claim 19, wherein the means for setting further comprises:
means for determining whether a second virtual object was already in the selected state for the avatar; and
if so, means for setting the second virtual object to be in the un-selected state for the avatar.

21. The computer system as claimed in claim 16, wherein operation of the means for generating the de-selection event is done by a virtual world framework, and wherein the means for de-activating further comprises:
means for receiving, by the virtual world framework, the generated de-selection event;
means for determining whether the virtual object is in the selected state for the avatar; and
if the virtual object is in the selected state, means for setting the virtual object to be in the un-selected state for the avatar, de-activating the virtual object and notifying the virtual object of the un-selected state, and for ignoring the received de-selection event otherwise.

22. The computer system as claimed in claim 21, wherein the means for setting further comprises:
means for determining whether a second virtual object has an outer logical proximity range that the avatar remains within; and
if so, means for setting the second virtual object to be in a re-selected state for the avatar.

23. The computer system as claimed in claim 21, wherein the means for setting further comprises:
means for determining whether the avatar has a re-selection flag set on; and
if the re-selection flag is set on, means for determining whether a second virtual object has an outer logical proximity range that the avatar remains within and, if so, means for setting the second virtual object to be in a re-selected state for the avatar.

24. A computer system contained within a computer network, the computer network having multiple computers connected together using telecommunications mechanisms, wherein an avatar selects a virtual object by proximity of a first distance from the virtual object and maintains an interactive relationship within the virtual object within a second distance from the virtual object, wherein the second distance is further from the virtual object than the first distance, the computer system comprising:
means for defining two logical proximity ranges for the virtual object, wherein a first of the logical proximity ranges is an inner logical proximity range and a second of the logical proximity ranges is an outer logical proximity range, the inner logical proximity range being located at the first distance and corresponding to selection of the virtual object while the outer logical proximity range is located at the second distance and corresponds to de-selection of the virtual object; and
means for using the inner logical proximity range and the outer logical proximity range in concert to manage activation of the virtual object, further comprising:
means for registering, by the virtual object, an inner logical proximity sensor at the inner logical proximity range;
means for determining when the inner logical proximity sensor is triggered by a first navigation of the avatar;
means for generating a selection event when the inner logical proximity sensor is triggered;
means for activating the virtual object when the selection event is generated and the virtual object is not in a selected state;
means for registering, by the virtual object, an outer logical proximity sensor at the outer logical proximity range when the selection event is generated;
means for determining when the outer logical proximity sensor is triggered by a subsequent navigation of the avatar;
means for generating a de-selection event when the outer logical proximity sensor is triggered;
means for de-activating the virtual object when the de-selection event is generated and the virtual object is in the selected state; and means for registering, by the virtual object, the inner logical proximity sensor at the inner logical proximity range when the de-selection event is generated.

25. A computer program product on a computer-readable media wherein an avatar selects a virtual object by proximity of a first distance from the virtual object and maintains an interactive relationship with the virtual object within a second distance from the virtual object in a virtual world, wherein the second distance is further from the virtual object than the first distance, the computer program product comprising:

computer-readable program code means for defining two logical proximity ranges for the virtual object, wherein a first of the logical proximity ranges is an inner logical proximity range and a second of the logical proximity ranges is an outer logical proximity range, the inner logical proximity range being located at the first distance and corresponding to selection of the virtual object while the outer logical proximity range is located at the second distance and corresponds to de-selection of the virtual object; and computer-readable program code means for using the inner logical proximity range and the outer logical proximity range in concert to manage activation of the virtual object, further comprising:

computer-readable program code means for registering, by the virtual object, an inner logical proximity sensor at the inner logical proximity range;

computer-readable program code means for registering, by the virtual object, an outer logical proximity sensor at the outer logical proximity range;

computer-readable program code means for determining when the inner and outer logical proximity sensors are triggered;

computer-readable program code means for generating a selection event when the inner logical sensor is triggered by a first navigation of the avatar in the virtual world;

computer-readable program code means for activating the virtual object when the selection event is generated and the virtual object is not in a selected state;

computer-readable program code means for generating a de-selection event when the outer logical proximity sensor is triggered by a subsequent navigation of the avatar; and computer-readable program code means for de-activating the virtual object when the de-selection event is generated and the virtual object is not in an un-selected state.

26. The computer system as claimed in claim 25, wherein operation of the computer-readable program code means for generating the selection event is performed by the virtual object, and wherein the computer-readable program code means for activating further comprises:

computer-readable program code means for receiving, by the virtual object, the generated selection event;

computer-readable program code means for determining whether the virtual object is in the un-selected state for the avatar; and if the virtual object is in the un-selected state, computer-readable program code means for setting the virtual object to be in the selected state for the avatar and activating the virtual object, and for ignoring the received selection event otherwise.

27. The computer system as claimed in claim 25, wherein operation of the computer-readable program code means for generating the de-selection event is done by the virtual object, and wherein the computer-readable program code means for deactivating further comprises:

computer-readable program code means for receiving, by the virtual object, the generated de-selection event;

computer-readable program code means for determining whether the virtual object is in the selected state for the avatar; and if the virtual object is in the selected state, computer-readable program code means for setting the virtual object to be in the un-selected state for the avatar and de-activating the virtual object, and for ignoring the received de-selection event otherwise.

28. The computer system as claimed in claim 25, wherein operation of the computer-readable program code means for generating the selection event is done by a virtual world framework, and wherein the computer-readable program code means further comprises:

computer-readable program code means for receiving, by the virtual world framework, the generated selection event;

computer-readable program code means for determining whether the virtual object is in the un-selected state for the avatar; and if the virtual object is in the un-selected state, computer-readable program code means for setting the virtual object to be in the selected state for the avatar, activating the virtual object, and notifying the virtual object of the selected state, and for ignoring the received selection event otherwise.

29. The computer system as claimed in claim 28, wherein the computer-readable program code means for setting further comprises:

computer-readable program code means for determining whether a second virtual object was already in the selected state for the avatar; and if so, computer-readable program code means for setting the second virtual object to be in the un-selected state for the avatar.

30. The computer system as claimed in claim 25, wherein operation of the computer-readable program code means for generating the de-selection event is done by a virtual world framework, and wherein the computer-readable program code means for deactivating further comprises:

computer-readable program code means for receiving, by the virtual world framework, the generated de-selection event;

computer-readable program code means for determining whether the virtual object is in the selected state for the avatar; and if the virtual object is in the selected state, computer-readable program code means for setting the virtual object to be in the un-selected state for the avatar; de-activating the virtual object, and notifying the virtual object of the un-selected state, and for ignoring the received de-selection event otherwise.

31. The computer system as claimed in claim 30, wherein the computer-readable program code means for setting further comprises:

computer-readable program code means for determining whether a second virtual object has an outer logical proximity range that the avatar remains within; and if so, computer-readable program code means for setting the second virtual object to be in a re-selected state for the avatar.

32. The computer system as claimed in claim 30, wherein the computer-readable program code means for setting further comprises:

computer-readable program code means for determining whether the avatar has a re-selection flag set on; and if the re-selection flag is set on, computer-readable program code means for determining whether a second virtual object has an outer logical proximity range that the avatar remains within and, if so, computer-readable program code means for setting the second virtual object to be in a re-selected state for the avatar.

33. A computer program product on a computer-readable media wherein an avatar selects a virtual object by proximity of a first distance from the virtual object and maintains an interactive relationship with the virtual object within a second distance from the virtual object, wherein the second distance is further from the virtual object than the first distance, the computer program product comprising:

computer-readable program code means for defining two logical proximity ranges for the virtual object, wherein a first of the logical proximity ranges is an inner logical proximity range and a second of the logical proximity ranges is an outer logical proximity range, the inner logical proximity range being located at the first distance and corresponding to selection of the virtual object while the outer logical proximity range is located at the second distance and corresponds to de-selection of the virtual object; and computer-readable program code means for using the inner logical proximity range and the outer logical proximity range in concert to manage activation of the virtual object, further comprising:

computer-readable program code means for registering, by the virtual object, an inner logical proximity sensor at the inner logical proximity range;

computer-readable program code means for determining when the inner logical sensor is triggered by a first navigation of the avatar;

computer-readable program code means for generating a selection event when the inner logical proximity sensor is triggered;

computer-readable program code means for activating the virtual object when the selection event is generated and the virtual object is not in a selected state;

computer-readable program code means for registering, by the virtual object, an outer logical proximity sensor at the outer logical proximity range when the selection event is generated;

computer-readable program code means for determining when the outer logical proximity sensor is triggered by a subsequent navigation of the avatar;

computer-readable program code means for generating a de-selection event when the outer logical proximity sensor is triggered;

computer-readable program code means for de-activating the virtual object when the de-selection event is generated and the virtual object is in the selected state; and computer-readable program code means for registering, by the virtual object, the inner logical proximity sensor at the inner logical proximity range when the de-selection event is generated.

34. A method of selecting a virtual object by proximity in a virtual world and maintaining an interactive relationship with the virtual object, the method comprising the steps of:

defining two logical selection ranges for the virtual object, wherein a first of the logical selection ranges is an inner logical selection range and a second of the logical selection ranges is an outer logical selection range, the inner logical selection range being located at a first distance from the virtual object and corresponding to selection of the virtual object while the outer logical selection range is located at a second distance from the virtual object and corresponds to de-selection of the virtual object, the second distance being further away from the virtual object than the first distance;

registering an inner logical selection sensor at the inner logical selection range;

registering an outer logical selection sensor at the outer logical selection range; and using the inner logical selection range and the outer logical selection range in concert to manage activation of the virtual object, further comprising the steps of:

generating a selection event when the inner logical selection sensor is triggered by an avatar navigating in the virtual world and the virtual object is not in a selected state;

activating the virtual object when the selection event is generated;

generating a de-selection event when the outer logical sensor is triggered by the avatar navigating in the virtual world and the virtual object is not in an un-selected state; and de-activating the virtual object when the de-selection event is generated.

35. A method for an avatar to select a virtual object by proximity of a first distance from the virtual object and maintain an interactive relationship with the virtual object within a second distance from the virtual object, wherein the second distance is further from the virtual object than the first distance, the method comprising the steps of:

defining two logical selection ranges for the virtual object, wherein a first of the logical selection ranges is an inner logical selection range and a second of the logical selection ranges is an outer logical selection range, the inner logical selection range being located at the first distance and corresponding to selection of the virtual object while the outer logical selection range is located at the second distance and corresponds to de-selection of the virtual object; and using the inner logical selection range and the outer logical selection range in concert to manage activation of the virtual object, further comprising the steps of:

registering, by the virtual object, an inner logical selection sensor at the inner logical selection range;

determining when the inner logical selection sensor is triggered by a first navigation of the avatar;

generating a selection event when the inner logical selection sensor is triggered and the virtual object is not in a selected state;

activating the virtual object when the selection event is generated;

registering, by the virtual object, an outer logical selection sensor at the outer logical selection range when the selection event is generated;

determining when the outer logical selection sensor is triggered by a subsequent navigation of the avatar;

generating a de-selection event when the outer logical selection sensor is triggered and the virtual object is in the selected state;

de-activating the virtual object when the de-selection event is generated; and registering, by the virtual object, the inner selection logical sensor at the inner logical selection range when the de-selection event is generated.

* * * * *